United States Patent [19]

Fudim

[11] Patent Number: 4,840,064
[45] Date of Patent: Jun. 20, 1989

[54] LIQUID VOLUME MONITORING APPARATUS AND METHOD

[75] Inventor: Efrem V. Fudim, Milwaukee, Wis.

[73] Assignee: Sundstrand Corp., Rockford, Ill.

[21] Appl. No.: 168,477

[22] Filed: Mar. 15, 1988

[51] Int. Cl.$^4$ .............................................. G01F 23/14
[52] U.S. Cl. ............................... 73/290 B; 73/290 R; 73/149; 141/83
[58] Field of Search .................. 73/290 B, 149, 290 R, 73/302, 291, 301; 141/83, 95; 340/612, 618, 614; 33/126.7

[56] References Cited

U.S. PATENT DOCUMENTS

| | | | |
|---|---|---|---|
| 2,116,636 | 5/1938 | Neumann | 73/149 |
| 2,162,180 | 9/1988 | Odier | 73/290 B |
| 2,378,849 | 6/1945 | Helleberg et al. | 73/290 B |
| 2,849,881 | 9/1988 | Anderson | 73/290 B |
| 3,217,540 | 9/1988 | Talbot | 73/290 B |
| 3,363,461 | 9/1988 | Minkoff | 73/149 |
| 3,430,667 | 3/1969 | Hughes | 73/301 |
| 3,494,192 | 2/1970 | Zahid | 73/290 B |
| 3,624,828 | 9/1988 | Edwards | 73/290 B |
| 3,744,306 | 9/1988 | Krueger | 73/290 B |
| 4,305,284 | 9/1988 | Rybicki et al. | 73/302 |
| 4,354,383 | 9/1988 | Hartel | 73/302 |
| 4,553,431 | 9/1988 | Nicolai | 73/290 B |
| 4,602,344 | 7/1986 | Ferretti et al. | 73/291 |

Primary Examiner—William A. Cuchlinski, Jr.
Assistant Examiner—Jeffrey J. Hohenshell
Attorney, Agent, or Firm—Antonelli, Terry & Wands

[57] ABSTRACT

An apparatus (9) is disclosed for determining the volume of liquid (18) in a container (1) which is being provided with an in flow and an out flow of liquid such that there normally remains an ullage volume (8) in the container filled with gas. A timer (13) actuated valve (11) is provided for interrupting one of the in flow and the out flow of liquid. A pressure sensor (10) detects the pressure of the gas in the ullage volume (8) of the container (1) during the interruption of the one of the in flow and out flow of the liquid, and a microprocessor (14) calculates the volume of liquid (18) in the container (1) from the detected change in pressure of the gas during the interruption. The apparatus and associated method are particularly advantageous for determining the volume of liquid in a liquid reservoir of an integrated drive generator of an aircraft engine since the determination of the liquid volume can be accomplished with the reservoir of irregular shape in various attitudes, at various temperatures and under conditions of acceleration and minimal additional weight being added to the aircraft.

20 Claims, 1 Drawing Sheet

4,840,064

LIQUID VOLUME MONITORING APPARATUS AND METHOD

TECHNICAL FIELD

The invention is directed to an apparatus and method for determining the volume of liquid in a container which is being provided with an in flow and out flow of liquid. More particularly, the present invention is directed to an apparatus and method for determining the volume of liquid in a liquid reservoir of an integrated drive generator of an aircraft engine wherein during operation of the drive generator an in flow and an out flow of liquid to the reservoir are provided such that there normally remains an ullage volume in the reservoir filled with gas.

BACKGROUND ART

An integrated drive generator (IDG) of an aircraft engine is a hydraulicly controlled electrical generator which is mounted to the aircraft engine and driven by the engine. The IDG is designed to operate successfully at any aircraft attitude. It is also designed to be internally sealed from ambient atmosphere during operation. The IDG is filled to a predetermined level with a liquid which is used, for example, to hydraulically vary the transmission ratio of a variable ratio transmission from the aircraft engine to the generator and also to lubricate and cool components of the IDG. If the IDG is overfilled with liquid, excessive liquid thrashing losses and heat generation will occur during operation which can damage the IDG components. If there is too little liquid in the IDG, damage to the IDG components can result because of overheating and inadequate lubrication, and proper hydraulic control of the IDG components may not be possible. Thus, it is desirable to be able to monitor the liquid volume in the IDG.

Known methods and apparatus for determining the volume of liquid in an IDG are dependent on the liquid level in the IDG. A dip stick is an example of such a known apparatus. These are problematical because the measurements obtained with level dependent techniques will not be accurate for a volume of irregular shape where there are changes in the liquid level due to changes in attitude, temperature and during acceleration. There is a need for an improved apparatus and method for determining the volume of liquid in an IDG liquid reservoir of irregular shape which provides accurate volume indications even when the aircraft is operating in various attitudes, temperatures and accelerations up to 60 g.

It is known from U.S. Pat. Nos. 2,162,180 and 4,553,431, for example, to determine the amount of liquid in a container using the gas low (i.e., PV=constant) by providing a special arrangement for injecting a fluid, especially a gas, into the gas in the ullage volume of the container and monitoring the resulting pressure change to determine the ullage volume and, then, by substracting the ullage volume from the total container volume to determine the liquid volume in the container. However, these known apparatus and methods are disadvantageous in that they require special, additional arrangements for injecting a known sufficiently large volume of a fluid into the container. For example, in U.S. Pat. No. 4,553,431 an air pump is provided for injecting air into the ullage gas volume to change the pressure for determining the quantity of liquid in the container. Air is also injected in the apparatus and method of U.S. Pat. No. 2,162,180 but the patentee states that a known volume of a liquid could be injected for measuring purposes.

DISCLOSURE OF INVENTION

An object of the present invention is to provide an apparatus and method for determining the volume of liquid in a container, particularly the reservoir of an IDG, while the IDG is operating in any of various attitudes, at temperatures up to 500° and under accelerations of up to 60 g. A further object of the invention is to provide an apparatus and method for determining the volume of liquid in a container where the container may have an irregular shape as with the liquid reservoir of an IDG. An additional object of the invention is to provide an apparatus and method for determining the volume of liquid in a container which meets the stringest weight, reliability and cost requirements for incorporation in an IDG of an aircraft.

Under normal operating conditions, the oil reservoir of an IDG has an in flow of oil from one or more scavenge pumps and an out flow of oil determined by a charge pump. The in flow and out flow during normal operation of the liquid containment system of the IDG are such that there normally remains an ullage volume in the container or reservoir of the IDG which is filled with gas such as air. The above and other objects are attained according to the apparatus and method of the invention for determining the volume of liquid in a container by briefly interrupting one of the in flow of liquid to the container and the out flow of liquid from the container, detecting the pressure of the gas in the ullage volume of the container, and calculating the volume of liquid in the container from the change in the pressure of the gas in the ullage volume of the container during the interruption of the one of the in flow and out flow of liquid while the other of the in flow and out flow of liquid is continued. Thus, the apparatus and method of the invention do not require the use of additional, special arrangements for injecting a gas or liquid into the liquid containment system of the IDG whereby the stringent weight requirements for operation in an aircraft can be met. The invention is also particularly advantageous in that it permits the accurate monitoring of the volume of liquid in the IDG container or reservoir even with changing aircraft attitude, and at temperatures up to 500° F. and accelerations up to 60 g, and where the oil reservoir itself has an irregular shape. According to another feature of the invention, the one of the in flow and out flow of liquid is intermittently interrupted for a short period of time for intermittently determining the volume of liquid in the container whereby the liquid volume in the container can be monitored throughout the operation of the IDG and associated aircraft if desired and without substantially interfering with the normal operation of the IDG.

The apparatus of the invention for determining the volume of liquid in a container which is being constantly provided with an in flow of liquid and an out flow of liquid such that there normally remains an ullage volume filled with gas in the container comprises means for interrupting one of the in flow of liquid to the container and the out flow of liquid from the container, means for detecting the pressure of a gas in an ullage volume of the container and means for calculating the volume of liquid in the container from a detected pressure change of the gas in the ullage volume of the container during an interruption of said one of the in flow and out flow of liquid. Pursuant to the method and apparatus of the invention, the means for calculating calculates the volume of liquid, $V_L$ in the container according to the equation:

$$V_L = V_T - \frac{\Delta t}{\Delta p} QP$$

where $V_T$ is the total volume of said container;

$\Delta t$ is the length of the time interval over which the gas pressure change is detected during an interruption;

$\Delta p$ is the detected change in pressure of the gas in the ullage volume of the container during the time interval $\Delta t$;

Q is the rate of flow of the other of the in flow and the out flow which is not interrupted during an interruption, Q having a positive value where it is an out flow rate and a negative value where it is the in flow rate; and P is the gas pressure in the ullage volume of the container before the interruption.

The means for interrupting includes a valve for interrupting one of the in flow and out flow of liquid and a timer for actuating the valve. The timer means actuates the valve means to intermittently interrupt one of the in flow and out flow of liquid for a short period of time for intermittently determining the volume of liquid in the container.

According to a further feature of the apparatus of the invention, the means for interrupting one of the in flow and out flow of liquid comprises means for diverting said one flow of liquid to an accumulator during a period time when said one flow of liquid is interrupted. The means for calculating is a microprocessor according to the disclosed, preferred embodiment of the invention. In a case that the flow rate of the other of the in flow and out flow of liquid which is not interrupted during an interruption is variable or not known, a means for detecting the flow rate of said other of the in flow and out flow of liquid is provided for determining the flow rate Q of said other flow of liquid. In the disclosed embodiment, the means for interrupting interrupts the in flow of liquid to the container while the out flow is continued.

These and other objects, features and advantages of the present invention will become more apparent from the following description when taken in connection with the accompanying drawings, which show, for purposes of illustration only, one preferred embodiment in accordance with the present invention.

BEST MODE FOR CARRYING OUT THE INVENTION

Figure 1A:
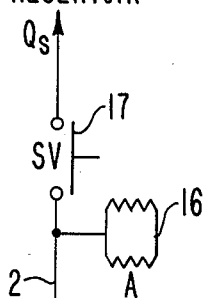
FIG. 1a is a schematic illustration of one arrangement for interrupting the in flow of liquid to the reservoir of an IDG in an apparatus of the present invention.

Referring now to the drawings, a portion of a closed, liquid containment system of an IDG comprises a container 1 as a reservoir for a liquid 18 such as oil. An inlet passage 2 provides an in flow of liquid to the container and an outlet passage 3 is for an out flow of liquid from the container. The liquid from the passage 3 flows to the IDG components 21 for hydraulic control, cooling and lubrication purposes and is then returned to the container 1 via the passage 2. A scavenge pump 4 pumps liquid through the inlet passage 2 from the IDG components 21 to the container 1 by way of a cooler 5 and a deaerator 6 located in the inlet passage 2. A charge pump 7 advances liquid through the outlet passage 3 from the container 1 to the IDG components. The container 1 is shown with a regular shape in FIG. 3 but it normally has a very irregular shape. During operation of the closed liquid containment system of the IDG, both pumps are operated constantly such that there normally remains an ullage volume 8 in the container 1. The ullage volume 8 is filled with a gas, typically air. A check valve, not shown, is provided in the container 1 to release gas above a given pressure for preventing over pressurization, but the check valve does not open during normal operation of the IDG.

Figure 2:
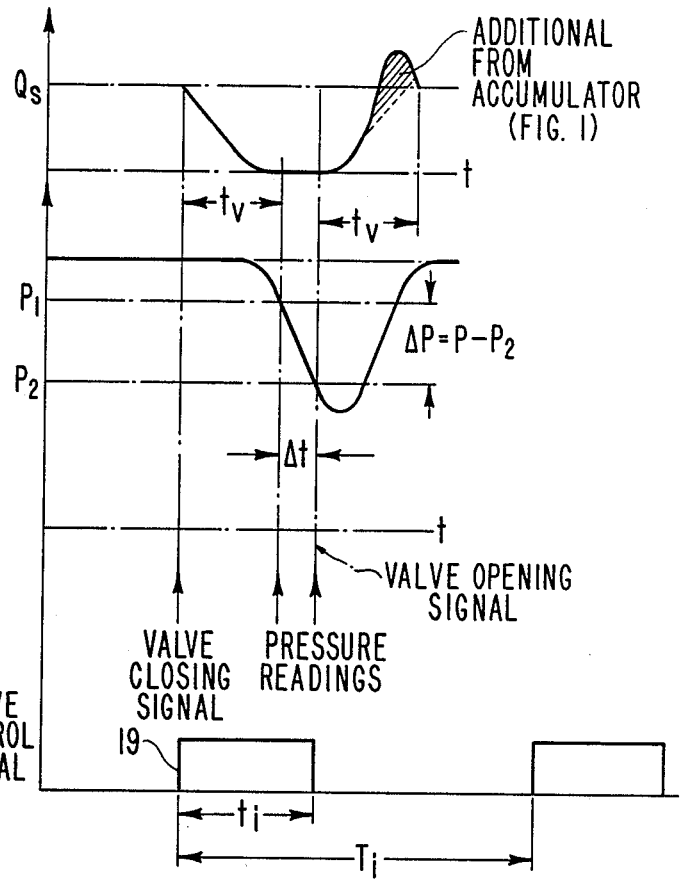
FIG. 2 is a graph illustrating the scavenge flow rate of liquid to the IDG reservoir as a function of time, and also the gas pressure in the ullage volume in the IDG container as a function of time and the control signal for the valve for interrupting the in flow of liquid to the container as a function of time with the method and apparatus of the invention.
Figure 3:
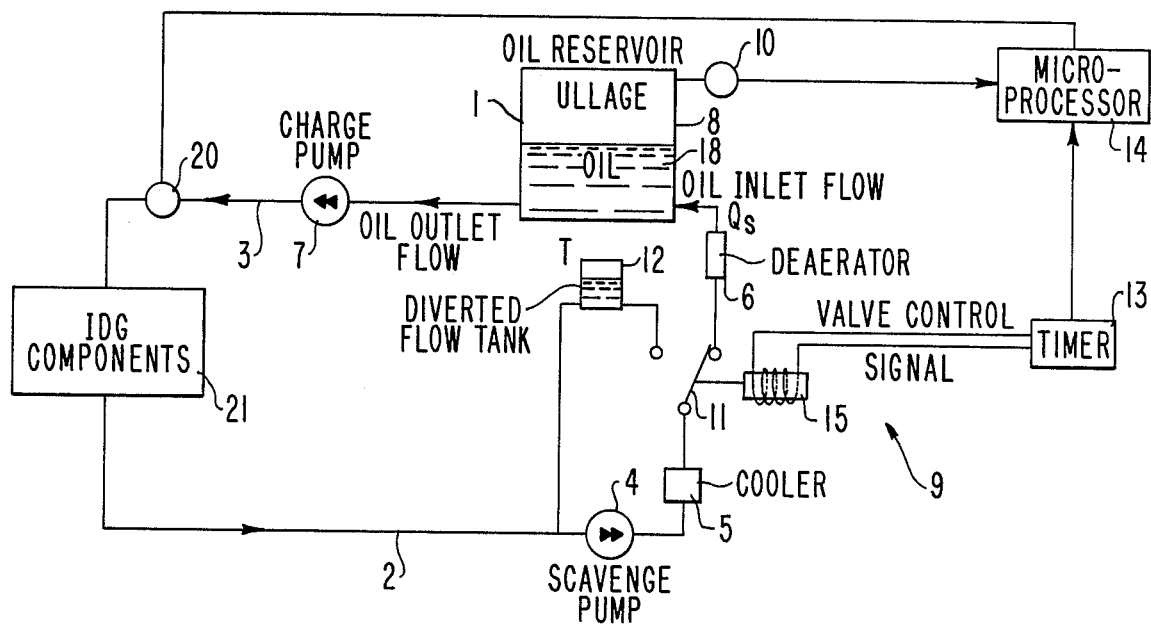
FIG. 3 is a schematic illustration of the apparatus of the present invention combined with an IDG.

An apparatus of the invention, generally designated at 9, for determining the volume of liquid in the container 1 comprises a pressure sensor 10 for detecting the pressure of the gas in the ullage volume 8 of the container 1, and a means for interrupting the in flow of liquid to the container 1. As shown in FIG. 3, the means for interrupting includes three-way valve 11 for opening and closing the passage 2 to produce desired interruptions of inlet oil flow. An additional small tank 12 is provided to accept the flow diverted from the oil reservoir 1 during an interruption. The duration of interruption $t_i$ and its frequency or period $T_i$ are set by a timer 13 which generates a valve control signal 19 illustrated in FIG. 2. The timer 13 also determines the moments of reading gas pressure P from pressure sensor 10 with the calculating device, microprocessor 14.

Figure 1B:
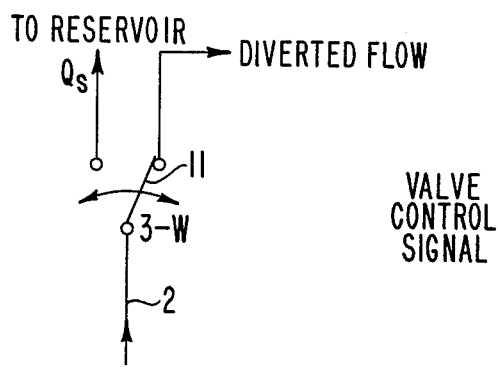
FIG. 1b is a schematic illustration of a preferred form of interrupting the in flow of liquid to a reservoir of an IDG in an apparatus of the invention.

The electrical control signal 19 from the timer 13 actuates a solenoid 15 which in turn moves the three-way valve 11 between a first position shown in FIG. 3 wherein the in flow through the inlet passage 2 from the scavenge pump 4 is supplied to the container 1, and a second position where the valve closes passage 2 and diverts the in flow to the small tank 12. The flow to the container 1 is interrupted for a short period of time $t_i$ after which the timer 13 actuates the solenoid 15 so that the valve 11 is again switched to open the passage 2 and direct the in flow to the container 1. This diversion of the in flow is illustrated schematically in FIG. 1b. In an alternate form of the arrangement for interrupting the in flow of liquid to the container as shown in FIG. 1a, an accumulator 16, for example, a bellows or bladder type accumulator, accepts the flow from the inlet passage 2 when the solenoid operated valve 17 is actuated by the timer 13 to close the inlet passage. The accumulator 16 returns the flow to the inlet passage when the valve 17 reopens the inlet passage 2 to allow in flow of liquid to the container 1.

The timer 13 controls the times for reading the gas pressure in the ullage volume 8 using pressure sensor 10 and the microprocessor 14. More particularly, as shown in FIG. 2, after the solenoid actuated valve 11 is actuated to close the inlet passage 2 and interrupt the in flow of liquid to the container 1, two successive pressure readings $P_1$ and $P_2$ are made at a known time interval $\Delta t$. The difference between the pressure readings is $\Delta p$. The volume of the liquid $V_L$ in the container 1 is calculated according to the equation:

$$V_L = V_T - \frac{\Delta t}{\Delta p} QP$$

where $V_T$ is the total volume of the container 1;

$\Delta t$ is the length of the time interval over which the gas pressure change is detected during an interruption;

$\Delta p$ is the detected change in pressure of the gas in the ullage volume 8 of the container during the time interval $\Delta t$;

Q is the rate of flow of the out flow of the liquid from the container; and

P is the gas pressure in the ullage volume 8 of the container before the interruption. The values of P and $\Delta P$ are determined using the pressure sensor 10, timer 13 and microprocessor 14. Since the valve 11 does not close instantaneously, the interruption $t_i$ is preferably chosen as:

$$t_i = t_v + \Delta t$$

where $t_v$ is the closing time of the slowest valve. The rate of the out flow Q of liquid from the container during an interruption can in most instances be assumed to be a constant value and need not be measured. However, a flow meter 20 can be provided in the outlet passage 3 to measure the rate of out flow in instances where this value is unknown or variable. If Q is not measured and assumed constant, temperature correction of Q variable can be introduced.

Since the out flow Q in the outlet passage 3 caused by the operation of the charge pump 7 is typically relatively large, a very short interruption of the scavenge or in flow $Q_s$ through the inlet passage 2 to the container 1 produces significant pressure change in the gas of the ullage volume 8 in the container. For example, where P=10 psi, $V_T$=0.4 gal, Q=9 gpm=0.15 ga/sec, at $\Delta t$=0.01 sec, $\Delta p$=0.0375 psi, which is $\approx 1''$ $H_2O$. The volume change during this period $\Delta t$ and the scavenge or in flow $Q_s$ to be diverted from the container 1 is $\Delta V = 1.5 \times 10^{-3}$ gal $\approx 6$ cc.

The above equation for calculating the volume of liquid in the container 1 is derived from the gas state equation. More specifically, when the in flow $Q_s$ of liquid from the scavenge pump 4 is interrupted, the volume of liquid in the container 1 drops at a rate determined by the amount of liquid out flowing out of the container via outlet passage 3 and charge pump 7. The ullage volume 8 is therefore increasing so that the gas pressure therein is dropping. From the value of the gas pressure drop and the amount (volume) of out flow of liquid from the container 1 passing via charge pump 7 during the period of time of the pressure drop, the container oil volume can be calculated. Thus, periodic short-time interruptions can be used to monitor intermittently the liquid volume in the container 1.

The apparatus and method of the invention monitor the volume of liquid in the container 1 by periodically changing, for a short period of time, the gas volume in the container 1 and sensing the resultant change in gas pressure using the pressure sensor 10. Where the amount and temperature of the gas are constant during ullage volume change, according to the ideal gas law:

$$pv = \text{constant},$$

$$\Delta(pv) \approx p\Delta V - V\Delta p = 0, \text{ and} \quad \text{(I)}$$

$$V \approx \frac{\Delta V}{\Delta p} P \quad \text{(II)}$$

where V and P are gas volume and pressure before volume change respectively, $\Delta V$ is the volume increase and $\Delta P$ is the resulting pressure decrease. If $V_T$ is the total volume of the reservoir cavity, the liquid volume, $V_L$, can be expressed by $$V_L = V_T - V = V_T - \frac{\Delta V}{\Delta P} P \quad \text{(III)}$$

Volume change $\Delta V$ is produced by disrupting scavenge flow $Q_s$ into the container 1 as discussed above. With no flow into the container 1, the scavenge flow into the container, $Q_s$, is zero. The volume change $\Delta V$ can be expressed by $$\Delta V = Q \Delta t \quad \text{(IV)}$$

where Q is the rate of the out flow, and $\Delta t$ is the time during which the pressure in the container 1 decreases by the amount $\Delta p$.

From equations (III) and (IV), the liquid volume in the container 1 can be expressed as being equal to:

$$V_L = V_T - \frac{\Delta t}{\Delta p} QP \quad \text{(V)}$$

From the above, it can be seen that the apparatus and method of the invention for determining the volume of liquid in a container which is being provided with an in flow and an out flow of liquid such that there normally remains an ullage volume in the container can be used to frequently monitor the liquid level during the normal operation of the liquid containment system without significantly disrupting the operation of the system. This is possible because only a very short interruption of the in flow of liquid to the container and the out flow of liquid from the container, less than a second, for example, is necessary to determine the volume of liquid in the container. Moreover, no special apparatus need be added for injecting a fluid such as a gas into the container so that the stringent, weight, reliability and cost requirements for aircraft can be met while providing an accurate determination of the volume of liquid in a container.

Equation (V) assumes that the amount of gas in ullage volume 8 changes negligibly during the time interval $\Delta t$. When this is not the case, equation (V) has the following form:

$$V_L = V_T - \frac{\Delta t}{\Delta p} (QP + iR\theta) \quad \text{(VI)}$$

where i is mass flow rate of gas into or out of ullage volume 8 (i is positive when the gas flow is into volume 8 and negative when out of volume 8); R is gas constant, and $\theta$ is absolute temperature of the gas. Where the amount of gas in ullage volume 8 changes, the apparatus of FIG. 3 can be provided with flow control valves 22 and 23 and a flow meter 24 for controlling and monitoring the gas flow into and out of ullage volume 8 as desired.

While I have shown and described only one embodiment in accordance with the present invention, it is understood that the same is not limited thereto, but it is susceptible to numerous changes and modifications as known to those skilled in the art. For example, the invention could be used with other closed liquid containment systems than an IDG. And the out flow of liquid from the container could be interrupted instead of the in flow as in the disclosed embodiment. Therefore, I do not wish to be limited to the details shown and described herein but intend to cover all such changes and modifications as are encompassed by the scope of the appended claims.

I claim:

1. An apparatus for determining the volume of liquid in a container which is being provided with an in flow of liquid and an out flow of liquid such that there normally remains an ullage volume in the container which is filled with gas comprising means for interrupting one of the flows of liquid, means for detecting the pressure of the gas in the ullage volume of the container during an interruption of said one of the flows of liquid, and means for calculating the volume of liquid in said container from a change in the pressure of the gas in the ullage volume of said container during an interruption of said one of the flows of liquid.

2. The apparatus according to claim 1, wherein said means for calculating calculates the volume of liquid, $V_L$, in said container according to the equation:

$$V_L = V_T - \frac{\Delta t}{\Delta p} QP$$

where $V_T$ is the total volume of said container;
$\Delta t$ is the length of the time interval over which the gas pressure change is detected during an interruption;
$\Delta p$ is the detected change in pressure of the gas in the ullage volume of the container during the time interval $\Delta t$;
Q is the rate of flow of the other of the flows of liquid which is not interrupted during an interruption, Q having a positive value where it is the out flow rate and a negative value where it is the in flow rate; and
P is the gas pressure in the ullage volume of the container before the interruption.

3. The apparatus according to claim 1, wherein said means for interrupting includes valve means for interrupting one of flows of liquid and timer means for actuating said valve means.

4. The apparatus according to claim 3, wherein said timer means actuates said valve means to intermittently interrupt one of the flows of liquid for a short period of time for intermittently determining the volume of liquid in said container.

5. The apparatus according to claim 1, wherein said means for interrupting one of the flows of liquid comprises means for diverting said one of the flows of liquid to an accumulator during a period of time when said one of the flows of liquid is interrupted.

6. The apparatus according to claim 1, wherein said means for calculating is a microprocessor.

7. The apparatus according to claim 1, further comprising means for detecting the flow rate of the other of the flows of liquid which is not interrupted during an interruption of said one of the flows of liquid.

8. The apparatus according to claim 1, wherein said means for interrupting interrupts the in flow of liquid to said container.

9. The apparatus according to claim 1, wherein said container is a liquid reservoir of an integrated drive generator of an aircraft engine.

10. In a liquid containment system comprising a container as a reservoir for a liquid, inlet passage means for an in flow of liquid to the container, outlet passage means for an out flow of liquid from the container, pump means for simultaneously flowing liquid to said container through said inlet passage means and flowing liquid from said container through said outlet passage means during normal operation of said containment system such that there normally remains an ullage volume in the container which is filled with gas, the improvement comprising an apparatus for determining the volume of liquid in said container comprising means for detecting the pressure of the gas in the ullage volume of the container, means for interrupting one of the flows of liquid, and means for calculating the volume of liquid in said container from a change in the pressure of the gas in the ullage volume of said container during an interruption of said one of the flows of liquid.

11. The liquid containment system according to claim 10, wherein said means for calculating calculates the volume of liquid, $V_L$, in said container according to the equation:

$$V_L = V_T - \frac{\Delta t}{\Delta p} QP$$

where $V_T$ is the total volume of said container;
$\Delta t$ is the length of the time interval over which the gas pressure change is detected during an interruption;
$\Delta p$ is the detected change in pressure of the gas in the ullage volume of the container during the time interval $\Delta t$;
Q is the rate of flow of the other of the flows of liquid which is not interrupted during an interruption, Q having a positive value where it is the out flow rate and a negative value where it is the in flow rate; and
P is the gas pressure in the ullage volume of the container before the interruption.

12. The liquid containment system according to claim 10, wherein said means for interrupting includes valve means for interrupting one of the flows of liquid and timer means for actuating said valve means.

13. The liquid containment system according to claim 12, wherein said timer means actuates said valve means to intermittently interrupt one of the flows of liquid for a short period of time for intermittently determining the volume of liquid in said container.

14. The liquid containment apparatus according to claim 10, wherein said means for interrupting one of the flows of liquid comprises means for diverting said one of the flows of liquid to an accumulator during a period of time when said one of the flows of liquid is interrupted.

15. The liquid containment system according to claim 10, wherein said means for calculating is a microprocessor.

16. The liquid containment system according to claim 10, further comprising means for detecting the flow rate of the other of the flows of liquid which is not interrupted during an interruption of said one of the flows of liquid.

17. The liquid containment system according to claim 10, wherein said means for interrupting, interrupts the in flow of liquid to said container.

18. The liquid containment system according to claim 10, wherein said container is a liquid reservoir of an integrated drive generator of an aircraft engine.

19. A method for determining the volume of liquid in a container which is being provided with an in flow and an out flow of liquid such that there normally remains an ullage volume in the container which is filled with gas comprising the steps of interrupting one of the flows of liquid, detecting the pressure change of the gas in an ullage volume of the container during the interruption of the one of the flows of liquid, and calculating the volume of liquid in the container from the detected pressure change of the gas.

20. The method according to claim 19, wherein the volume of liquid, $V_L$, in the container is calculated according to the equation:

$$V_L = V_T - \frac{\Delta t}{\Delta p} QP$$

where $V_T$ is the total volume of a container;
- $\Delta t$ is the length of the time interval over which the gas pressure change is detected during an interruption;
- $\Delta p$ is the detected change in pressure of the gas in the ullage volume of the container during the time interval $\Delta t$;
- Q is the rate of flow of the other of the flows of liquid which is not interrupted during an interruption of the one of the in flow and out flow of liquid, Q having a positive value where it is the out flow rate and a negative value where it is the in flow rate; and
- P is the gas pressure in the ullage volume of the container before the interruption.

* * * * *